May 25, 1926. 1,586,072
H. A. CRISPIN ET AL
METHOD FOR PRODUCING GROOVED CUP FINISH IN BOTTLES AND
ARTICLE PRODUCED THEREBY
Filed June 19, 1925
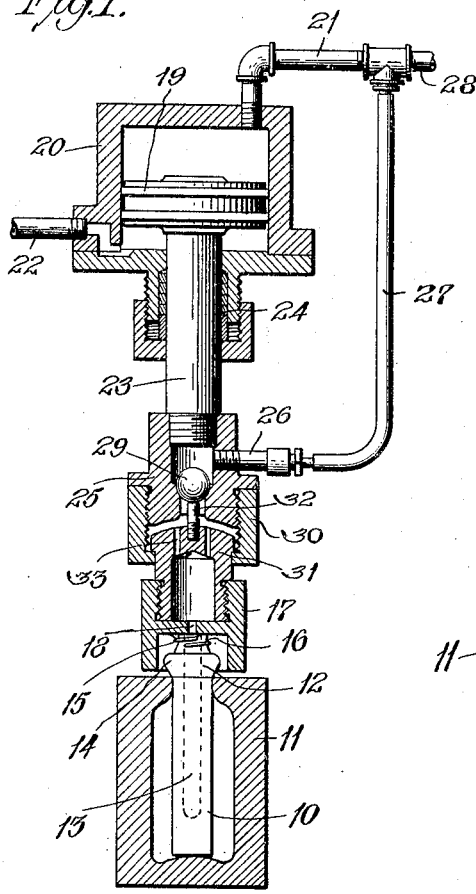
Fig.1.
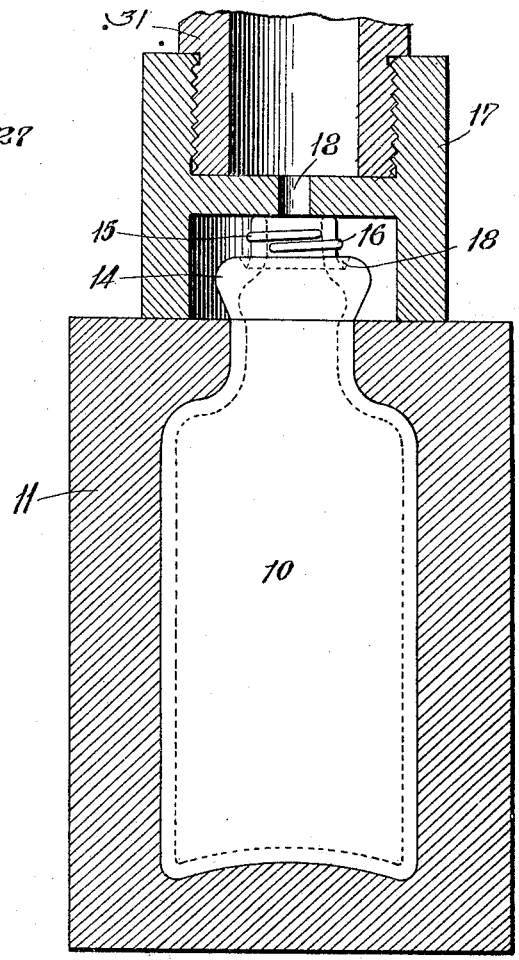
Fig.2.
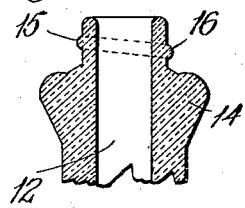
Fig.3.
Fig.4.
Inventors.
Harry A. Crispin
and
Henry J. Pawling
by Munson H. Lane
Attorney.

Patented May 25, 1926.

1,586,072

UNITED STATES PATENT OFFICE.

HARRY A. CRISPIN AND HENRY J. PAWLING, OF SALEM, NEW JERSEY, ASSIGNORS TO SALEM GLASS WORKS, OF SALEM, NEW JERSEY, A CORPORATION OF NEW JERSEY.

METHOD FOR PRODUCING GROOVED CUP FINISH IN BOTTLES AND ARTICLE PRODUCED THEREBY.

Application filed June 19, 1925. Serial No. 38,186.

The invention relates to an improved method for producing a grooved cup finish in glass bottles, and to the article produced thereby. An important object of the invention is to provide such a method which may be carried out automatically and mechanically with but little variation in the present standard bottle making apparatus.

The method consists broadly in pressing down or telescoping an upstanding cork end of the bottle neck into the flanged neck rim, thus forming a little cup or groove about the top or cork end. This operation is preferably performed after the neck of the bottle has been shaped in the blank forming operation, but before the bottle has been blown to final form, and while the glass is still in semi-molten or plastic condition. The cup is for the purpose of retaining any residue of liquid which may remain on the rim of the bottle after the bottle has been opened and a portion of its contents used. This cup is of particular importance where the bottle is to contain a poisonous substance, which might otherwise run down the side of the bottle, and be wiped off on the hands of the user. The inventors recognize that grooves have hitherto been formed in bottles, but so far as they are aware, no one has ever provided such a groove by forcing down the top or corking end of the bottle into the flanged neck rim while the bottle is in semi-molten condition.

The invention will be more readily understood by reference to the accompanying drawings in which is shown one form of apparatus which may be used for carrying out the improved method, though it will be obvious that other forms of apparatus may be employed if desired or the method may be performed by hand.

Fig. 1 is a view partly in section and partly in elevation showing a portion of the bottle blowing apparatus, a blank with a partially finished neck being shown in the mold, and the blow-head being placed over the bottle neck.

Fig. 2 is a sectional view on an enlarged scale showing the blow-head and mold, the blow-head having been lowered so as to telescope the cork end of the bottle neck into the rim, and the bottle having been blown to finished form in the mold.

Fig. 3 is a sectional view showing the bottle neck in partially finished form as it appears when the bottle blank is placed in the blown mold as shown in Fig. 1.

Fig. 4 is a similar view showing the bottle neck after the cup forming operation, illustrated in Fig. 2, has been performed.

Referring first to Fig. 1, a bottle blank 10 of semi-molten glass is shown hanging in a mold 11 of any ordinary type. The neck 12 of the bottle and the central opening 13 have been previously formed by the well-known operations, which form no part of the present invention. As shown, the neck 12 is provided with a wide flange or rim 14 which is substantially flat on top, and with an upstanding cork end 15 which may be formed with suitable cap-retaining threads 16 if desired.

A blow-head 17 is placed over the bottle neck 12 with its central opening 18 in registry with the bottle opening 13. It will be noted, however, that the bottom of the blow-head 17 does not reach quite to the top of the mold 11, this being an important feature of the invention.

To form a groove in the bottle neck, it is only necessary to exert sufficient pressure upon the blow-head 17 to cause it to telescope the upstanding cork end 15 of the bottle neck into the rim 14, thus producing a groove 18 in the rim of the bottle neck, (see Figs. 2 and 4). Preferably the bottle blank is blown to final form in substantially the same operation with the formation of the groove in the bottle neck.

Any suitable means for lowering the blow-head may be employed. As shown, the blow-head 17 is operated by means of a piston 19 working in a suitable cylinder 20, to which air may be admitted through pipe 21 above or pipe 22 below the piston head. A piston rod 23 passes through suitable packing 24 in the bottom of the chamber 22 and is shown as connected to a suitable valve chamber 25 to which air may be admitted through a pipe 26, connected by a flexible connection 27 to a source of air supply 28. A ball valve 29 is seated in the valve chamber. A housing 30 flanged as at 31 is secured to said valve, and within said housing is mounted a connecting member 31 to which is removably attached the blow-head 17. The member 31 is adapted to move for a limited distance within the housing 30 and is provided with a stem 32 adapted to unseat the ball valve 29 at the proper instant. Suitable air passages 33 are provided in the member 31 in order to connect the blow-head with the air pressure in chamber 25 as soon as the valve 29 has been raised.

The operation of the device will be evident from the foregoing description. Air pressure is first admitted to the cylinder 20 above the piston head 19 through air inlet 21, thus forcing down the piston rod 23 and with it the valve chamber 25. This downward movement unseats the ball valve 29, thus admitting compressed air to the blow-head to expand the bottle to finished form. Continued movement of the piston 19 forces the blow-head 17 downward until it is in contact with the top of the blow mold 11. This operation forces the cork end 15 of the bottle neck into the heavier rim part immediately below, forming the groove 18 shown in the finished bottle. The forming of the groove and the blowing of the bottle are thus substantially simultaneous operations.

The invention has been described in detail for the purpose of illustration, but it will be obvious that the method is subject to many variations, without departing from the spirit of the invention.

Having thus described our invention, what we claim as new and desire to secure by Letters Patent is:—

1. The method of forming a groove in a glass bottle neck having an upstanding top or corking end rising from a flanged rim, which consists in telescoping said upstanding corking end into said rim while the glass is in semi-molten condition, to form a cup-shaped groove.

2. An improvement in glass bottle making which consists in forming a cup-shaped groove in the bottle neck during the bottle blowing operation by pressing the top or cork end of the bottle neck down into the soft semi-molten glass of the neck rim.

3. An improvement in glass bottle making which consists in forming a bottle blank with a partially finished neck having an upstanding cork end and a flanged rim, then, while the material is in a semi-molten condition forcing the cork end downward into the rim, forming a cup-shaped groove, and blowing the bottle blank to finished form.

4. A glass bottle having a central upstanding cork end, and a rim surrounding said cork end and having a cup-shaped groove therein formed by telescoping the cork end into said rim while the glass is in semi-molten condition.

In testimony whereof we affix our signatures.

HARRY A. CRISPIN.
HENRY J. PAWLING.